A. E. McPHERSON.
DEMOUNTABLE RIM.
APPLICATION FILED SEPT. 16, 1918.
1,338,145.
Patented Apr. 27, 1920.
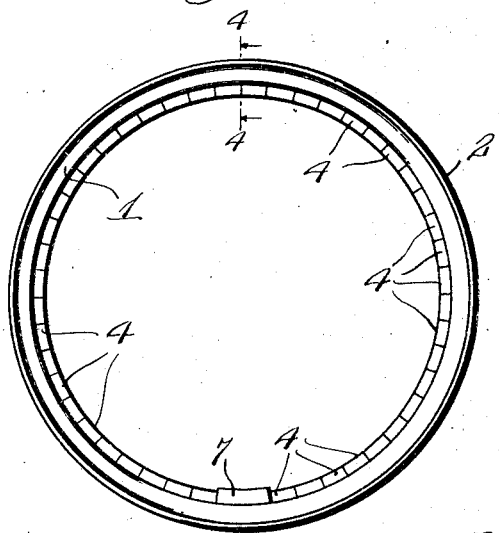
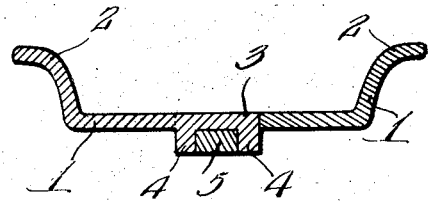
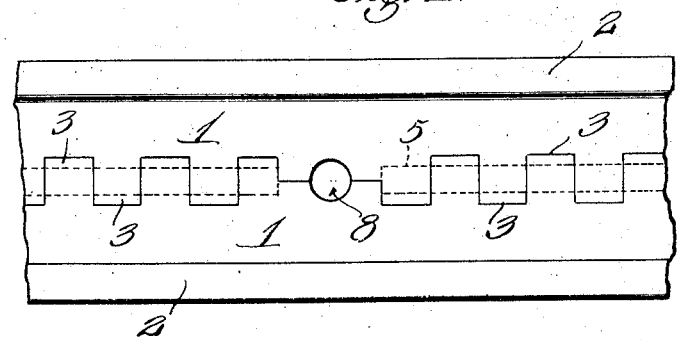
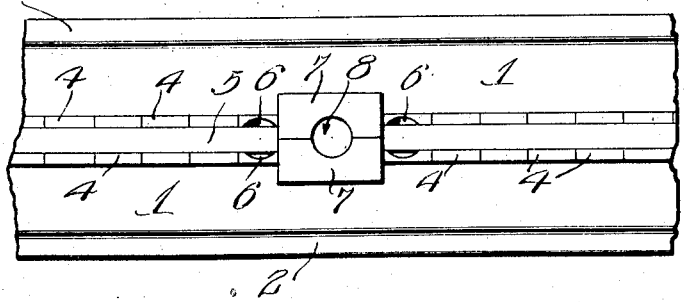
Inventor
Arthur E. McPherson

UNITED STATES PATENT OFFICE.

ARTHUR E. McPHERSON, OF BEAUMONT, TEXAS, ASSIGNOR TO JOE ROSENTHAL, OF BEAUMONT, TEXAS.

DEMOUNTABLE RIM.

1,338,145.  Specification of Letters Patent.  Patented Apr. 27, 1920.

Application filed September 16, 1918. Serial No. 254,296.

*To all whom it may concern:*

Be it known that I, ARTHUR EDISON MCPHERSON, a citizen of the United States, residing at Beaumont, in the county of Jefferson and State of Texas, have invented certain new and useful Improvements in Demountable Rims; and I do declare the following to be a full, clear, and exact description of the invention, such as will enable others skilled in the art to which it appertains to make and use the same.

My invention relates to improvements in demountable rims for automobiles and has for its principal object to provide a rim constructed of two identical sections detachably secured together and provided with means to engage the fixed rim, so as to prevent the tire and demountable rim from creeping, the formation of the device of two sections identical in all respects, serving to facilitate and cheapen manufacture, as well as insuring ease in applying the rim to the tire.

With the foregoing objects in view, the invention resides in the novel construction hereinafter fully described and claimed, and illustrated in the accompanying drawing.

Figure 1 is an edge view of the rim.

Fig. 2 is an elevation of a portion of the outer side of the rim.

Fig. 3 is a similar view of the inner side of the rim.

Fig. 4 is an enlarged transverse section on the plane of the line 4—4 of Fig. 1.

In the drawings above briefly described, the numerals 1 designate two identical annular sections of which the rim is formed, each of said sections having a bead engaging flange 2 on its outer edge and a plurality of rectangular lugs 3 projecting from its inner edge, the distance between said lugs being the same as the width of the lugs, whereby the lugs of each section may intermesh with those of the other section. On their inner sides, the lugs 3 are provided with pairs of parallel circumferentially extending offset ribs 4 which snugly receive therebetween a split locking ring 5, whereby the two sections are prevented from spreading but may easily be separated when required by removal of the ring in question. To facilitate such removal, the ribs 4 at the ends of the ring 5, are preferably cut away at 6 upon their inner edges, whereby a suitable tool may be inserted between the rim and the ring to pry the latter away from the former, so as to permit of its disengagement from the ribs.

The inner side of each rim section 1 is provided with a rectangular boss 7, the two bosses abutting each other and having notches 8 forming a valve stem opening. The bosses 7 coöperate in forming a rectangular key for reception in a suitable depression in the fixed rim of the wheel, whereby to prevent creeping of the demountable rim upon said fixed rim. As shown clearly in Fig. 3, the ends of the ring 5 terminate adjacent the bosses 7, and since said ring and ribs 6 rest upon the outer surface of the fixed rim, whereas the bosses extend into a recess or the like in the latter, it is essential that said bosses shall project beyond the inner sides of the ribs and the ring.

The arrangement of the ribs provides an annular channel for the locking ring without weakening the lugs 3 of the rim and permits said lugs and sections to be formed of much thinner and lighter material than would be required if the recesses were formed in the lugs.

By constructing the device in the novel manner shown and described, it is an easy matter to apply or remove a tire, it being simply necessary, in case of removal of the tire, to disengage the ring 5 from the ribs 7, whereupon the two sections 1 can be separated quickly and easily. A reversal of this operation is of course followed in applying another tire to the rim.

Since probably the best results are obtained from the details shown and described, they are by preference followed, but within the scope of the invention as claimed, numerous minor changes may well be made.

I claim:

A demountable rim formed of two annular sections having bead engaging flanges on their outer edges and intermeshed rectangular lugs on their inner edges, a pair of spaced parallel offset ribs on the inner side of each lug, the ribs of said lugs being alined and forming an annular channel when the sections are engaged, rectangular bosses on the inner sides of said annular sections and projecting beyond the inner sides of said ribs, said bosses abutting each other and being provided with notches forming a valve stem opening, and a split locking ring snugly received in the channel formed by said ribs with its ends contiguous to said bosses, the ribs adjacent to the ends of said ring being cut away on their inner edges to permit the easy removal of the ring.

In testimony whereof I have hereunto set my hand.

ARTHUR E. McPHERSON.

Witnesses:
W. L. STAFFORD,
C. H. WALRUTH.